FIG. 2(a)— 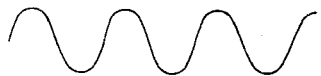
FIG. 2(b)— 
FIG. 2(c)— 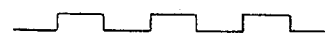
FIG. 2(d)— 
FIG. 2(e)— 
FIG. 2(f)— 
FIG. 2(g)— 
FIG. 2(h)— 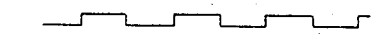
FIG. 2(i)— 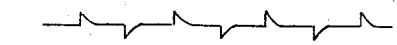
FIG. 2(j)— 
FIG. 2(k)— 
FIG. 2(l)— 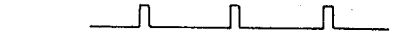

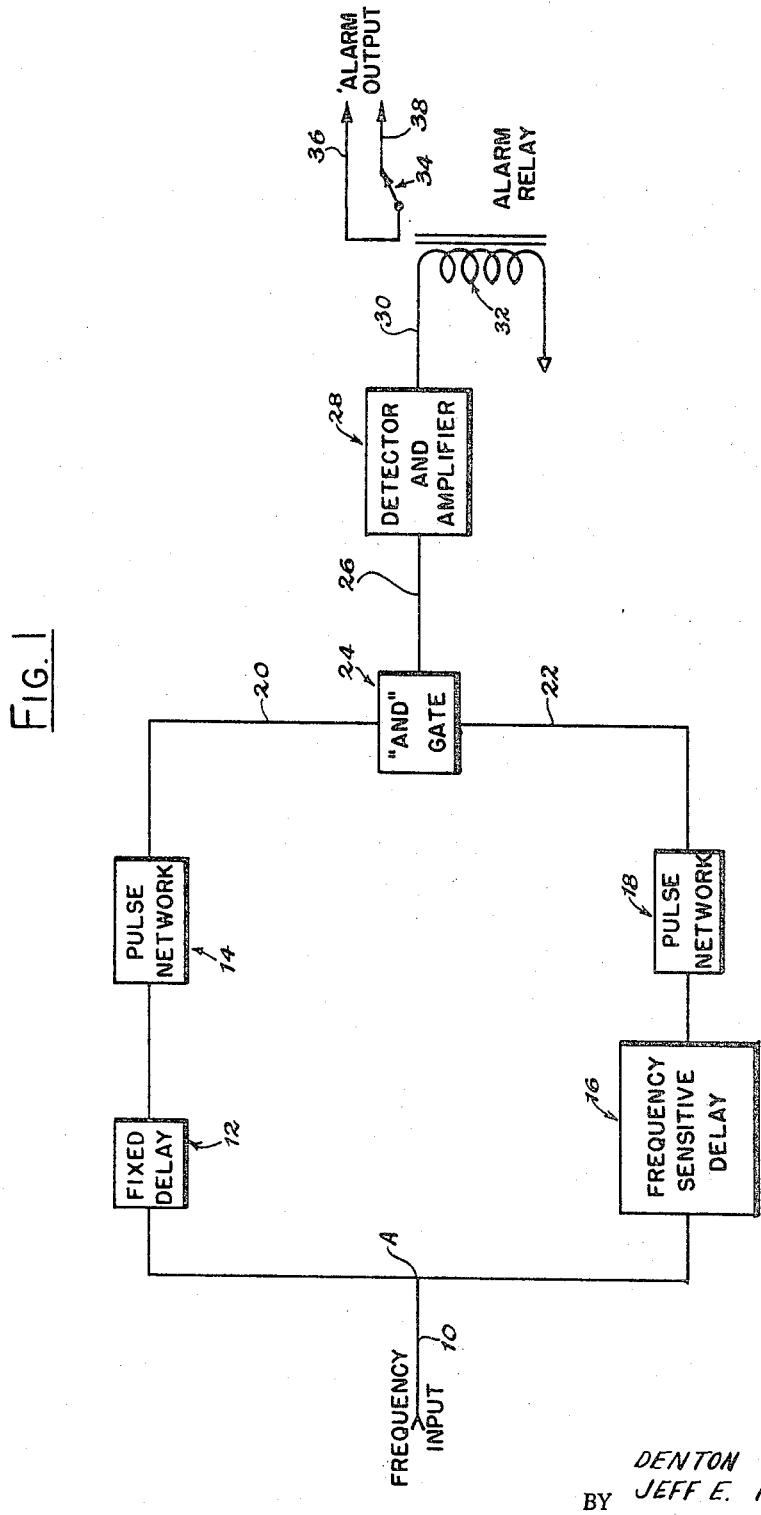

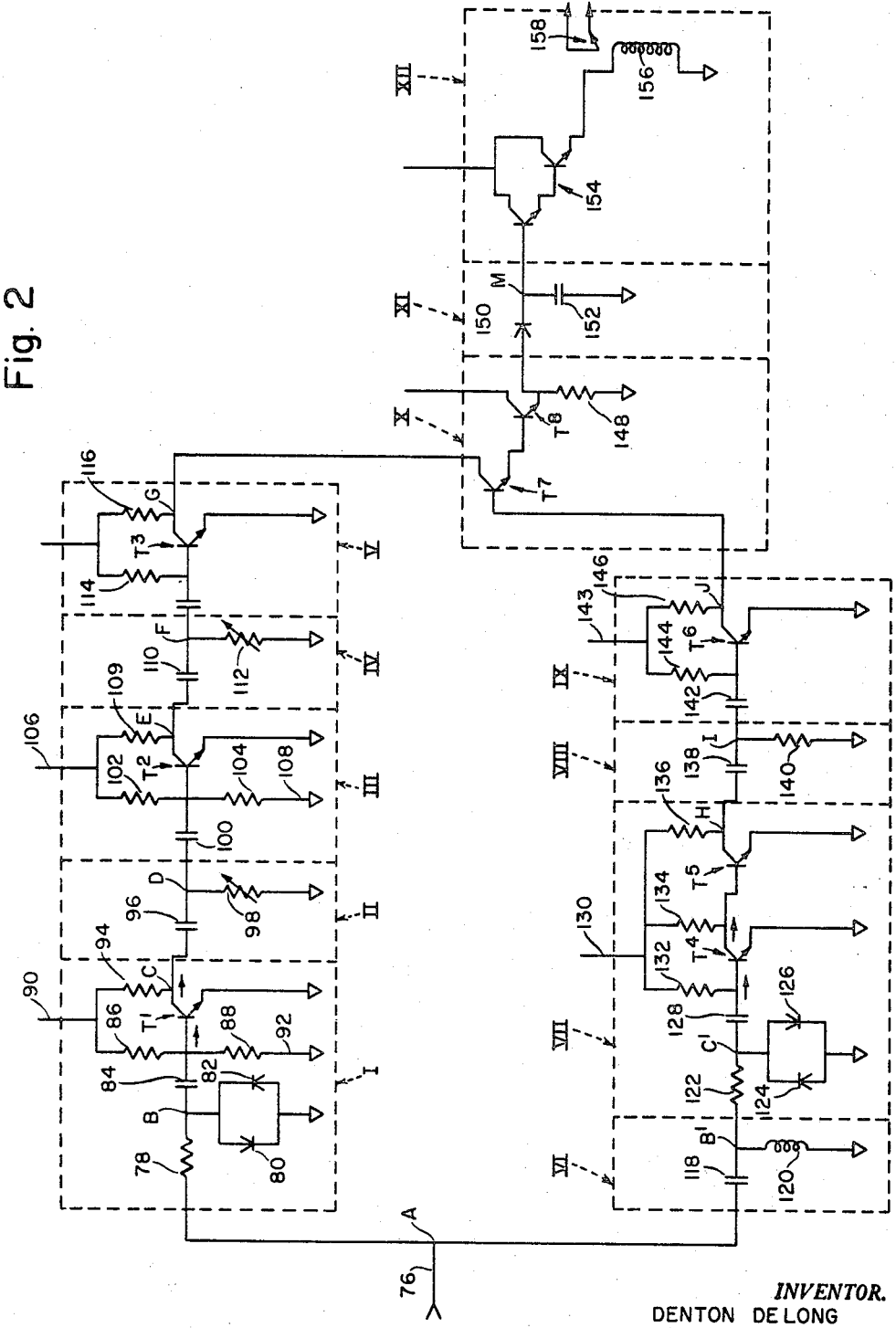

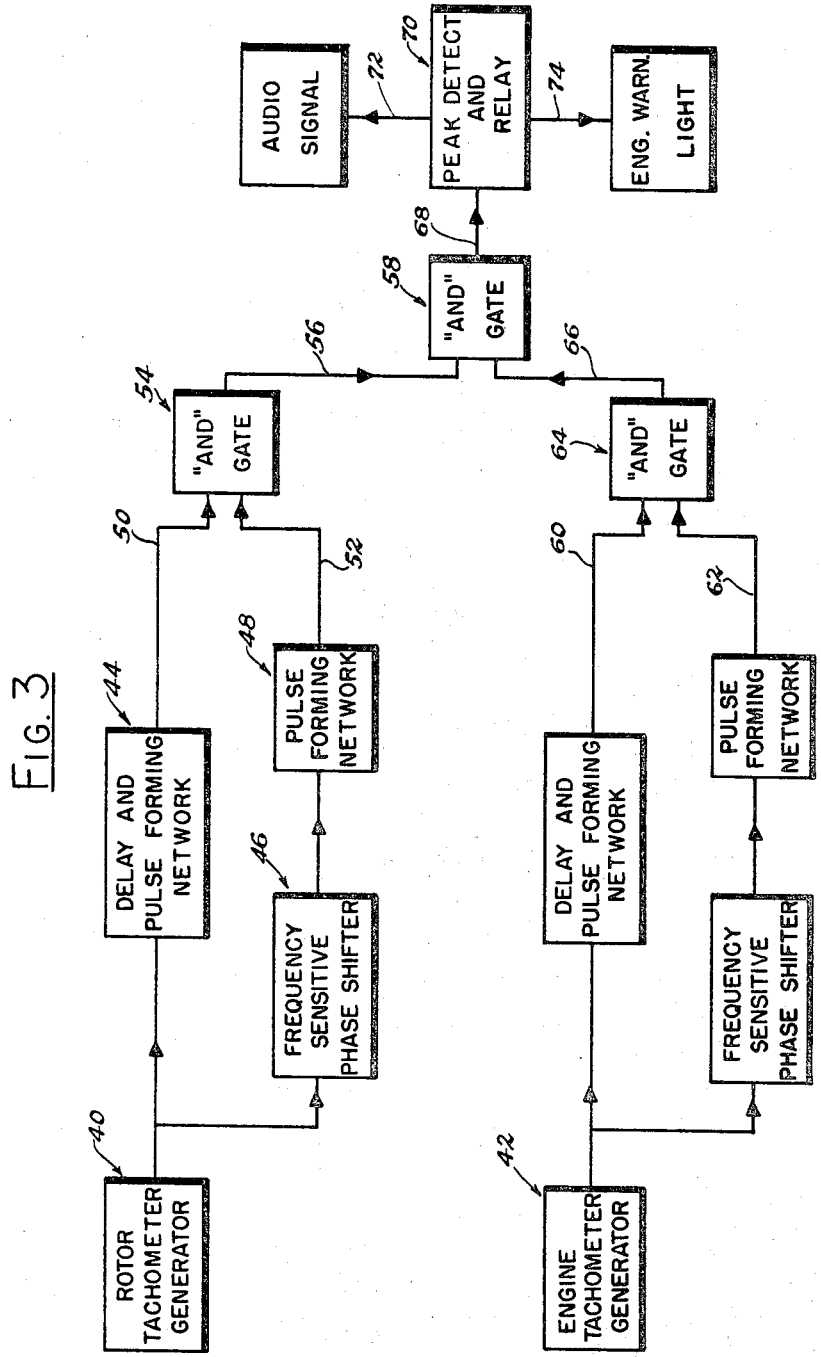

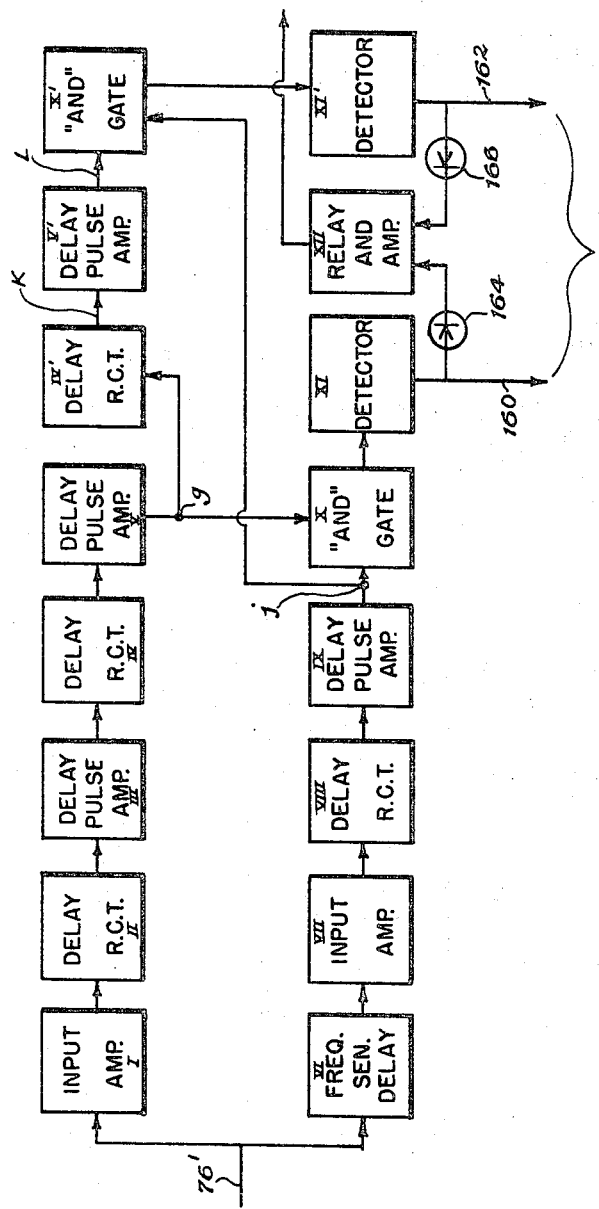

United States Patent Office 3,407,399
Patented Oct. 22, 1968

3,407,399
HELICOPTER WARNING SYSTEM
Denton De Long, Hurst, and Jeff E. Freeman, Fort Worth, Tex., assignors to Bell Aerospace Corporation, Wheatfield, N.Y.
Continuation-in-part of application Ser. No. 210,152, July 16, 1962. This application June 21, 1965, Ser. No. 470,311
14 Claims. (Cl. 340—263)

This invention relates to warning systems for rotating bodies and in particular pertains to an electrical system for providing warning and/or corrective signals in response to an over-speeding or under-speeding of the rotating body, with respect to a predesignated rotating speed range. This application is a continuation-in-part of my copending application, Ser. No. 210,152, filed July 16, 1962, now abandoned.

In the operation of aircraft, malfunctions of the rotating system during flight may result in an over-speeding or under-speeding of the propeller or rotor or other important component which would ultimately result in disaster.

For example, during helicopter flight there are various malfunctional circumstances which may occur that require immediate corrective procedure on the part of the pilot. In many cases, the only corrective procedure indicated is to start the craft in autorotation and because a substantial degree of altitude is required to make a safe landing, any malfunction which would cause loss of power or power control should be immediately relayed to the pilot so that corrective procedures may be embarked upon. For example, during a low power, high speed letdown, the engine will normally be operated at low rotational speed and light load so that it will not make any discernible noise. Consequently, if the engine ceases to function, the pilot may not become aware of this fact until the craft has reached an altitude so that safe autorotation could not be carried out.

As another example, malfunction of the engine governor could cause a dangerous condition and in general, as is stated hereinabove, any circumstances that do not permit the pilot to have full and complete control of the application of power to the craft could result in a dangerous situation if the pilot does not become quickly enough apprised of the malfunction. It is, accordingly, a primary concern of this invention to provide a warning system which will detect and give a warning in response to a rotational speed of either or both the engine and rotor which either exceeds or falls below a safe operating range.

More specifically, it is an object of this invention to provide apparatus for comparing two electrical pulses, one indicative of the frequency of the entity being monitored and the other characterized by fixed delay, coincidence or lack thereof of portions of these two pulses being utilized to provide control over a warning device.

A still further object of this invention is to provide a compound system wherein both the rotor and engine will be monitored in accord with the preceding object.

It is another object of this invention to provide a system as aforesaid wherein the signal from the fixed delay portion is further modified and compared so as to provide a difference signal for achieving corrective functions.

Other objects and advantages of the invention will appear from the description hereinbelow and the accompanying drawing wherein:

FIG. 1 is a block diagram illustrating in general the principles of the present invention;

FIG. 2 is a schematic of the system shown in FIG. 1;

FIG. 2a–2l are wave forms at different points in the circuit of FIG. 2;

FIG. 3 is a block diagram illustrating further principles of the present invention;

FIG. 4 is a block diagram illustrating a still further application of the present invention and illustrating certain modifications thereto.

Figures 5A, 5B:
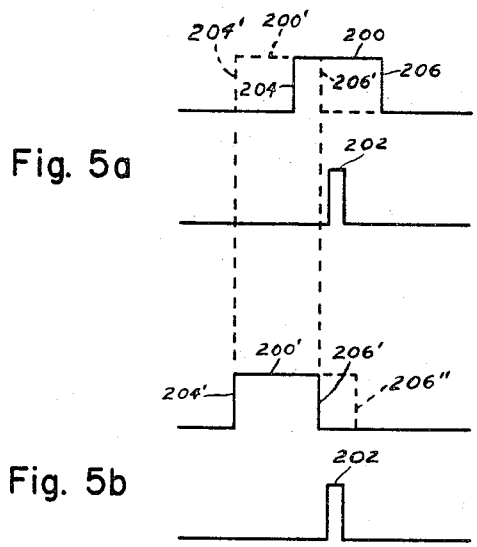
FIGS. 5a and 5b are waveforms illustrating certain principles of the invention.

Referring at this time more particularly to FIG. 1, an alternating signal is applied through conductor 10 from a suitable generator driven from either the helicopter engine or rotor, the voltage waveform from this generator at point A being generally as indicated in FIG. 2a. Part of this signal is applied to a fixed delay circuit indicated generally by the reference character 12 and then to a pulse network generally indicated by the reference character 14. Part of the input signal is also applied to a frequency sensitive delay circuit indicated generally by reference character 16 and thence to a pulse network 18. If the input frequency is within the range to which the various circuits are adjusted, coincidental or overlapping pulses from the networks 14 and 18 will be applied through conductors 20 and 22 to the "AND" gate 24. When the signals are so present, the "AND" gate output at conductor 26 will be sufficient for detection and amplification in the circuit 28 so that the output at conductor 30 of this latter circuit will energize the alarm relay 32 and open the normally closed switch 34 thereof. When, however, the outputs of the pulse networks 14 and 18 are not so co-ordinated as to effect energization of relay 32, the relay switch 34 will complete the external alarm circuit through the conductors 36 and 38. Thus, whenever the rotational speed of the associated engine or rotor varies above or below the predetermined range, a signal will be applied.

The circuit according to FIG. 1 has certain advantages in conjunction with helicopter usage. For example, during a low power, high speed letdown, the pilot will normally be so occupied by the controls he will not have time to monitor the engine tachometer. Consequently, should the engine stop or fall below its minimum or idle speed, the pilot will not usually be aware of this fact since the low power application of the engine will not cause sufficient engine noise as to permit ready detection of its presence, absence or approximate rotational speed. With the system as illustrated in FIG. 1, such condition of the engine may be immediately conveyed to the pilot by means of either audible or visible signals, or both, so that he may immediately take corrective measures before it is too late. For example, he may wish to immediately proceed with autorotation for landing.

The system of FIG. 1 may also be applied to the helicopter rotor so as to give an easily discernible signal when the rotor speed falls above or below proper operating range thereof. In some cases, it may be desirable to utilize the system of FIG. 1 in conjunction with both the engine and the rotor and to co-ordinate the signals, in the manner shown in FIG. 3. As illustrated in this figure, an alternating signal indicative of the speed of the rotor is obtained by a generator 40 driven by the rotor and a similar signal is obtained by an engine driven by generator 42. The signal from generator 40 is applied to the delay and pulse forming network 44 and to the delay network 46 and pulse forming network 48 corresponding to the blocks 16 and 18 of FIG. 1. Dependent upon the synchronization of the pulses at conductors 50 and 52, the "AND" gate 54 will be controlled to produce a pulse signal at conductor 56 extending to the "AND" gate 58. Similarly, synchronization of the pulses at conductors 60 and 62 all control the "AND" gate 64 whose output at 66 is also applied to an "AND" gate 58. With the two inputs at 56 and 66 overlapping or in synchronization to the "AND" gate 58, such "AND" gate will, at its output 68, operate the detector and relay 70 corresponding to the circuit 28 and relay 32 of FIG. 1 to produce no signal output at conductors 72 and 74. However, if either the engine or the rotor falls above or below its proper operating range, signals will be produced at conductors 72 and 74 to warn the pilot. Thus, with the compound system as shown in FIG. 3, the system will be sensitive to malfunctions in connection with either or both the engine rotational speed and the rotor rotational speed.

The basic circuit configuration of the system according to FIG. 1 is shown in FIG. 2. In this figure, the actuating signal is applied through the conductor 76 to junction A, this signal being at a frequency corresponding to the rotational speed of the engine or rotor, as the case may be. The signal may be produced by a suitable generator driven by the engine or rotor and is of a waveform generally as indicated in FIG. 2a.

Considering first the upper portion FIG. 2, the incoming signal from junction A is applied to a clipping circuit through the limiting resistor 78, the oppositely poled clipping diodes 80 and 82 being effective to form a near-square wave as shown in FIG. 2b for the junction B. In order to obtain well defined leading and trailing edges for this signal, an amplifier $T_1$, as shown, is used to achieve the square waveform at junction C illustrated in FIG. 2c. The near-square wave is coupled to the amplifier $T_1$ through the capacitor 84 and a voltage divider chain comprising resistors 86 and 88 is connected between a source of positive potential and ground potential by conductors 90 and 92, their junction being connected to the base electrode of the NPN transistor as shown. This transistor is connected as a grounded emitter and its collector electrode is connected to the positive potential source through the resistor 94. The bias current to this transistor is such that it is driven non-conductive during negative portions of the clipped input so that the waveform at junction C exhibits positive pulses coinciding therewith.

The output of the amplifier $T_1$ is applied to the delay circuit comprising the capacitor 96 and resistor 98 whose time constant is in the order of ¼ the period of the midpoint of the operating frequency range, producing a waveform generally as indicated in FIG. 2d, for junction D. The resistor 98 is adjustable so that, as set forth more particularly hereinafter, the lower limit of the frequency range is dictated thereby.

The waveform of junction D is coupled to the amplifier $T_2$ through the capacitor 100 and, as shown, bias current for the base electrode of this transistor is supplied by the resistor chain 102, 104 connected between a positive potential source and ground by conductors 106 and 108. The collector electrode of this transistor is also returned to the positive potential source through the resistor 109 and, as will be apparent from FIG. 2e (junction E), the bias for amplifier $T_2$ is such that during a negative portion of each input pulse, the transistor will be nonconductive, driving the collector electrode positive. A positive spike at the front edge of this pulse (FIG. 2e) and a negative spike at the trailing edge of this pulse is obtained at junction F by means of the differentiating circuit comprising the capacitor 110 and the resistor 112, as shown in FIG. 2f. Since the pulse amplifier $T_3$, having its base and collector electrodes connected to a source of positive potential by the resistors 114 and 116 respectively, is biased to produce a positive pulse at junction G in response only to negative input pulses, the duration of each such output pulse will depend upon the RC time constant of elements 110 and 112. This time constant is chosen so as to provide the requisite operating frequency range, as will be presently apparent. The resulting output is illustrated generally in FIG. 2g.

Turning now to the lower portion of FIG. 2, it will be seen that the input signal at junction A is also applied to a phase shifting circuit comprising the capacitor 118 and inductance 120, producing a 90° shift in phase of the input signal. The limiting resistor 122 and oppositely poled clipping diodes 124 and 126 produce a near-square waveform, the waveforms of junction B′ and C′ are similar to, but shifted in phase with respect to, the waveforms of junctions A and B. This near-square clipped signal is applied through coupling capacitor 128 to transistor $T_4$ which is biased to further square the wave. The base electrode is returned to a source of positive potential at conductor 130 through the resistor 132, the collector electrode is connected to the conductor 130 through the resistor 134 and emitter electrode is grounded. The collector electrode of the grounded emitter transistor $T_5$ is connected to the positive potential source through the resistor 136 and its base electrode is connected to the junction between the resistor 134 and the collector electrode of the transistor $T_4$ so that the transistor $T_5$ forms an inverter producing a waveform at junction J as indicated in FIG. 2j.

These positive pulses are applied to the differentiating network comprising the capacitor 138 and resistor 140 so that a positive spike is produced at the leading edge of each pulse and a negative spike is produced at the trailing edge of each pulse, as shown in FIG. 2i for the junction I. It will be noted that for the condition shown in which the input signal at junction A is at the mid-point of the operating range of the system, the negative spikes of FIG. 2i coincide with the positive pulses of FIG. 2g. Thus, by applying the waveform of FIG. 2i to the transistor $T_6$ which is biased to produce positive pulses coinciding with the negative spikes of FIG. 2i, simultaneous positive pulses will be applied to the collector and base electrodes of the "AND" gate transistor $T_7$. For this purpose, coupling is achieved by the capacitor 142 and the base and collector electrodes of the grounded emitter pulse amplifier $T_6$ are returned to a source of positive potential at conductor 143 through the resistors 144 and 146 respectively. The output at junction J is shown in FIG. 2j.

From the above, it will be apparent that the pulses of FIG. 2j will shift relative to the pulses of FIG. 2g as the frequency of the incoming signal varies. So long as these pulses overlap, the "AND" gate transistor $T_7$ will conduct, the range of overlap being a function of the duration of the pulses of FIG. 2g as achieved by the time constant of the differentiating network 110, 112. The output of the transistor $T_7$ is applied to the base of the transistor $T_8$ connected as an emitter follower and the output across load resistor 148 is applied through the detector diode 150 to a relatively large capacitor 152 so that the DC level at junction M will be proportional to the output of the emitter follower output. This voltage is used to drive a conventional amplifier circuit indicated generally by reference character 154 whose output, in turn, is employed to energize the coil 156 of a relay having a normally open switch 158 controlling the alarm circuit.

That is to say, with sufficient overlap between the pulses of FIGS. 2g and 2j, the relay switch 158 will be open, while cessation of overlap or insufficient overlap between these pulses, as occasioned by an input frequency at junction A which is either above or below the operating range, will permit the switch 158 to close and thus complete the warning or alarm circuit.

The resistors 98 and 112, FIG. 2, are shown to be variable, and this relationship is important as reference to FIGS. 5a and 5b will show. In FIG. 5a, the pulse 200 is the output, at G, of the fixed delay circuit, whereas the pulse 202 is the output, at J, of the frequency variable delay circuit. It will be appreciated that the width of the fixed delay pulse 200 will normally be much greater than the width of the frequency variable pulse 202 and that the locations, along the time axis, of the leading and trailing edges 204 and 206 of the pulse 200 will determine the lower and upper limits of the frequency range. That is to say, for decreasing frequency, the pulse 202 will shift to the left along the time axis until at the lower frequency limit, $f_1$, there is sufficient overlap between the pulses 200 and 202 to actuate the "AND" gate X. At the upper frequency limit, $f_2$, the pulse 202 will shift to the right along the time axis until insufficient overlap exists between the pulses 200 and 202 to actuate the "AND" gate X.

It frequently happens that the upper and lower frequency limits may not be precisely delineated, or that the limits for a particular aircraft may be altered. To accommodate, the resistor 98 is first adjusted to shift the pulse 200 along the time axis so that its leading edge 204' assumes a new location corresponding to a new lower frequency limit $f_3$ different from the aforementioned $f_1$. In FIG. 5a, the pulse 200 is shown as having been shifted to the left, so that $f_3$, $f_1$, and is indicated therein by dashed lines 200'. The trailing edge 206' of the shifted pulse will now, of course, define some new upper frequency limit $f_4$ which, for the condition shown, will be less than the aforementioned frequency $f_2$ and will differ therefrom by the same amount as $f_3$ differs from $f_1$. Ordinarily, this new upper limit $f_4$ will not correspond to the desired upper limit $f_5$ which may be less than, greater than, or equal to $f_2$. In any event, the resistor 112 is now adjusted to vary the width of the shifted pulse 200' so that its trailing edge 206' is placed at such position, 206", as to correspond to the desired upper limit $f_5$. This is shown in FIG. 5b wherein it will be seen that $f_5$ is greater than $f_4$ but less than $f_2$. Other conditions for both the lower and upper limits could of course prevail.

FIGS. 5a and 5b illustrate an important advantage of the present invention, the ability to meet many and varied requirements of upper and lower operating limits. This is an important advantage inasmuch as it allows the warning systems to be adapted to any set of conditions which may prevail. Further, a plurality of systems may be ganged in parallel, as in conjunction with multiple-engine aircraft, while yet assuring that none prematurely operates.

Referring now to FIG. 4 wherein a modified system is shown, it will be appreciated that the signal input from conductor 76' corresponds to the signal input in FIG. 2. Further the blocks I, II . . . IX in FIG. 4 correspond to the like numbered circuits of FIG. 2. In the system of FIG. 4, however, the output (FIG. 2g) of the pulse amplifier V is, in addition to being applied to "AND" gate X, applied to an RC delay circuit IV' which corresponds to the circuit IV. Thus, the pulses of FIG. 2g are differentiated to produce an output as shown in FIG. 2k and the delay pulse amplifier V', corresponding to the amplifier V, is biased to produce positive pulses in response to the negative differentiated pulses, producing an output as shown in FIG. 2e. Thus, whereas the "AND" gate X in conjunction with the detector XI produces a maximum DC level output for the condition shown in FIGS. 2g and 2j, it will be appreciated that the "AND" gate XI' (corresponding to gate XI) will be non-conductive at this time. Therefore, a maximum voltage difference will appear between the conductors 160 and 162, which voltage difference can be used as feedback to control the entity producing the frequency of the signal at conductor 76'. It will be further noted that as the input frequency increases, the gate X and its detector XI will produce a decreasing DC level output while the gate XI remains non-conductive. On the other hand, as the input frequency decreases, the DC level of detector XI will decrease while the DC level output of the "AND" gate X' and its associated detector XI' will increase.

The two detectors XI and XI' are connected by means of the isolating diodes 164 and 166 to the warning relay circuit XII so that the system according to FIG. 4 embodies the warning function of the system of FIG. 2 as well as embodying the capability for feedback equivalent to frequency error, as aforesaid.

We claim:
1. In a warning system comprising, in combination;
an alarm circuit including switch means adapted for disposition in dormant and signaling conditions;
gate means having a signal output for determining the condition of said switch means;
first and second pulse networks connected to said gate means and adapted to alter the signal output of said gate means in accord with coincidence of signals from such networks;
AC signal generating means adapted for connection to the mechanism being monitored;
a fixed delay circuit connected to said AC signal generating means and having its output connected to said first pulse network;
a frequency variable delay circuit connected to said AC signal generating means and having its output connected to said second pulse network; said frequency variable delay circuit comprising an LC phase shifting circuit connected to the AC signal generating means, a pulse forming circuit connected to the phase shifting circuit and having a positive pulse output in which the trailing edges of the positive pulses coincide with positive peak voltages of the AC signal generating input, a pulse amplifier, and a differentiating circuit connecting the pulse forming circuit to the amplifier, said amplifier being biased to respond only to negative-going input pulses thereto.
2. In a warning system comprising; in combination;
an alarm circuit including switch means adapted for disposition in dormant and signaling conditions;
gate means having a signal output for determining the condition of said switch means;
first and second pulse networks connected to said gate means and adapted to alter the signal output of said gate means in accord with the coincidence of signals from such networks;
AC signal generating means adapted for connection to the mechanism being monitored;
a fixed delay circuit connected to said AC signal generating means and having its output connected to said first pulse network;
a frequency variable delay circuit connected to said AC signal generating means and having its output connected to said second pulse network, said frequency variable delay circuit comprising an LC phase shifting circuit connected to the AC signal generating means, a pulse forming circuit connected to the phase shifting circuit and having a positive pulse output in which the trailing edges of the positive pulses coincide with positive peak voltages of the AC signal generating input, a pulse amplifier, and a differentiating circuit connecting the pulse forming circuit to the amplifier, said amplifier being biased to respond only to negative-going input pulses thereto, said fixed delay circuit comprising first and second pulse amplifiers, the first amplifier being connected to the input signal through an RC time circuit, the second amplifier being connected to the first amplifier through a differentiating circuit, and both amplifiers being biased to respond only to negative-going input pulses thereto.
3. In a warning system comprising, in combination;
an alarm circuit including switch means adapted for disposition in dormant and signaling conditions;
gate means having a signal output for determining the condition of said switch means;
first and second pulse networks connected to said gate means and adapted to alter the signal output of said gate means in accord with the coincidence of signals from such networks;
AC signal generating means adapted for connection to the mechanism being monitored;
a fixed delay circuit connected to said AC signal generating means and having its output connected to said first pulse network;
a frequency variable delay circuit connected to said

AC signal generating means and having its output connected to said second pulse network;
second gate means;
a second fixed delay circuit connected to the output of said first pulse network;
said second gate means being connected to the outputs of said second fixed delay circuit and said second gate pulse network.

4. In a warning system of helicopters comprising, in combination;
an alarm circuit including switch means adapted for disposition in dormant and signaling conditions;
gate means having a signal output for determining the condition of said switch means;
first and second pulse networks connected to said gate means and adapted to alter the signal output of said gate means in accord with the coincidence of signals from such networks;
AC signal generating means adapted for connection to the helicopter mechanism being monitored;
a fixed delay circuit connected to said AC signal generating means and having its output connected to said first pulse network;
a frequency variable delay circuit connected to said AC signal generating means and having its output connected to said second pulse network.

5. In a warning system for an aircraft having a rotary power plant, in combination;
an alarm circuit including switch means adapted for disposition in dormant and signaling conditions;
gate means having a signal output for determining the condition of said switch means;
AC signal generating means adapted for connection to the power plant and having a signal output whose frequency is proportional to the speed of rotation of the power plant;
a first pulse network coupled to the output of said AC signal generating means and having a pulse train output at the frequency of said output of the AC signal generating means and delayed a predetrmined amount with respect thereto;
a second pulse network coupled to the output of said AC signal generating means and having a pulse train output at the frequency of said output of the AC signal generating means and delayed with respect thereto by an amount proportional to such frequency;
the outputs of said first and second pulse networks being connected to said gate means.

6. In a warning system for an aircraft having a rotary power plant, in combination;
an alarm circuit including an alarm device and gate means for controlling said alarm device;
AC signal generating means adapted to be driven by the power plant and having an output whose frequency is dependent upon the speed of rotation of the power plant;
a first pulse network coupled to the output of said AC signal generating means for producing first output pulses occurring at the frequency of the AC signal, said first pulse network including means for controlling the initiation of said first output pulses in fixed delayed relation to the AC signal independent of the frequency of the AC signal, and means for fixing the termination of said first output pulses independently of the means for controlling their initiations, said first output pulses being coupled to said gate means;
a second pulse network coupled to the output of said AC signal generating means for producing second output pulses occurring at the frequency of the AC signal, said second output pulses being coupled to said gate means; said second pulse network including means for delaying the second output pulses with respect to the AC signal by an amount dependent upon the frequency of such signal whereby at a lower frequency limit $f_1$, as fixed by the initiation of said first output pulses, and at an upper frequency limit $f_2$, as fixed by the termination of said first output pulses, and at frequencies therebetween, said first and second output pulses overlap to actuate said gate means.

7. In a warning system for a helicopter having a power plant and a rotor driven by said power plant, comprising, in combination;
an alarm circuit including switch means adapted for disposition in dormant and signaling conditions;
gate means having a signal output for determining the condition of said switch means;
first and second pulse networks connected to said gate means and adapted to alter the signal output of said gate means in accord with the coincidence of signals from such networks;
AC signal generating means driven by said power plant and having an output whose frequency is proportional to the rotational speed of said power plant;
a fixed delay circuit connected to said AC signal generating means and having its output connected to said first pulse network;
a frequency variable delay circuit connected to said AC signal generating means and having its output connected to said second pulse network;
third and fourth pulse networks connected to said gate means and adapted to alter the signal output thereof in accord with the coincidence of signals from such third and fourth networks;
second AC signal generating means driven by said rotor and having an output whose frequency is proportional to the rotary speed of said rotor;
a fixed delay circuit connected to said second AC signal generating means and having its output connected to said third pulse network;
a frequency variable delay circuit connected to said second AC signal generating means and having its output connected to said fourth pulse network.

8. The system according to claim 7 wherein said gate means comprises a first "and" gate connected to the outputs of said first and second pulse networks, a second "and" gate connected to the outputs of said third and fourth pulse networks, and a third "and" gate connected to the outputs of the first and second "and" gates.

9. The system according to claim 5 wherein said second pulse network comprises an LC phase shifting circuit coupled to the AC signal generating means, a pulse forming circuit coupled to the phase shifting circuit and having a positive pulse output in which the trailing edges of the positive pulse coincide with positive peak voltages of the AC signal, a pulse amplifier, and a differentiating circuit coupling the pulse forming circuit to the amplifier, said amplifier being biased to respond only to negative-going input pulses thereto.

10. The system according to claim 5 wherein said second pulse network comprises an LC phase shifting circuit coupled to the AC signal generating means, a pulse forming circuit coupled to the phase shifting circuit and having a positive pulse output in which the trailing edges of the positive pulses coincide with positive peak voltages of the AC signal, a pulse amplifier, and a differentiating circuit coupling the pulse forming circuit to the amplifier, said amplifier being biased to respond only to negative-going input pulses thereto, said first pulse network comprising first and second pulse amplifiers, the first amplifier being coupled to the AC signal through an RC time circuit, the second amplifier being coupled to the first amplifier through a differentiating circuit, and both amplifiers being biased to respond only to negative-going input pulses thereto.

11. The system according to claim 10 wherein said RC time circuit and the last mentioned differentiating circuit are adjustable to vary their time constants.

12. The system according to claim 6 wherein said second pulse network comprises an LC phase shifting circuit coupled to the AC signal generating means, a pulse forming circuit coupled to the phase shifting circuit and having a positive pulse output in which the trailing edges of the positive pulses coincide with positive peak voltages of the AC signal, a pulse amplifier, and a differentiating circuit coupling the pulse forming circuit to the amplifier, said amplifier being biased to respond only to negative-going input pulses thereto.

13. The system according to claim 6 wherein said second pulse network comprises an LC phase shifting circuit coupled to the AC signal generating means, a pulse forming circuit coupled to the phase shifting circuit and having a positive pulse output in which the trailing edges of the positive pulses coincide with positive peak voltages of the AC signal, a pulse amplifier, and a differentiating circuit coupling the pulse forming circuit to the amplifier, said amplifier being biased to respond only to negative-going input pulses thereto, said first pulse network comprising first and second pulse amplifiers, the first amplifier being coupled to the AC signal through an RC time circuit, the second amplifier being coupled to the first amplifier through a differentiating circuit, and both amplifiers being biased to respond only to negative-going input pulses thereto.

14. The system according to claim 13 wherein said RC time circuit and the last mentioned differentiating circuit are adjustable to vary their time constants.

References Cited
UNITED STATES PATENTS

| | | |
|---|---|---|
| 2,876,004 | 3/1959 | Sink. |
| 2,968,803 | 1/1961 | Lindley _____ 340—271 |
| 3,010,066 | 11/1961 | Kwast _____ 324—70 |
| 3,028,556 | 4/1962 | DuVall. |
| 3,065,461 | 11/1962 | Aronis. |
| 3,098,970 | 7/1963 | Smith _____ 324—70 |
| 3,146,432 | 8/1964 | Johnson _____ 340—271 |

JOHN W. CALDWELL, *Primary Examiner.*

D. L. TRAFTON, *Assistant Examiner.*